(12) United States Patent
Uni et al.

(10) Patent No.: US 6,592,878 B2
(45) Date of Patent: Jul. 15, 2003

(54) ENHANCEMENT OF DEVELOPMENT OF OVIPAROUS SPECIES BY IN OVO FEEDING

(75) Inventors: Zehava Uni, New Ziona (IL); Peter R. Ferket, Raleigh, NC (US)

(73) Assignees: North Carolina State University, Raleigh, NC (US); Yissum Research Development Company of the Hebrew University of Jerusalem, Jerusalem (IL)

( * ) Notice: Subject to any disclaimer, the term of this patent is extended or adjusted under 35 U.S.C. 154(b) by 0 days.

(21) Appl. No.: 09/919,386

(22) Filed: Jul. 31, 2001

(65) Prior Publication Data

US 2002/0035965 A1 Mar. 28, 2002

Related U.S. Application Data

(60) Provisional application No. 60/222,744, filed on Aug. 3, 2000.

(51) Int. Cl.$^7$ .............................. A61K 9/00; A61K 6/00; A61K 47/00; A61F 13/00; A23K 1/165
(52) U.S. Cl. ..................... 424/400; 424/422; 424/439; 424/442
(58) Field of Search .............................. 424/422, 400, 424/439, 442

(56) References Cited

U.S. PATENT DOCUMENTS

| | | | |
|---|---|---|---|
| 4,458,630 A | | 7/1984 | Sharma et al. |
| 4,992,470 A | * | 2/1991 | Nissen .................. 514/578 |
| 5,028,421 A | | 7/1991 | Fredericksen et al. |
| 5,028,440 A | | 7/1991 | Nissen |
| 5,087,472 A | | 2/1992 | Nissen |
| 5,158,038 A | | 10/1992 | Sheeks et al. |
| 5,397,568 A | * | 3/1995 | Whitfill et al. ........... 424/178.1 |
| 5,976,580 A | * | 11/1999 | Ivey et al. ..................... 426/2 |
| 6,153,246 A | | 11/2000 | Gossart |
| 6,244,214 B1 | | 6/2001 | Hebrank |

OTHER PUBLICATIONS

Abstract, *Feeding of broiler chicks and piglets*, Russian Federation Patent No. 2,053,266 (Feb. 20, 1996).
Abstract, *Improving quality of broilers meat*, Russian Federation Patent No. 814,315 (Mar. 23, 1981).
Disclosure, *In ovo feeding of avian embryos to accelerate the development of gastrointestinal tract and elevate hatchlings weight*, U.S. Provisional Application Ser. No. 60/222,733 filed Aug. 3, 2000.

* cited by examiner

*Primary Examiner*—Gollamudi S. Kishore
*Assistant Examiner*—Todd D Ware
(74) *Attorney, Agent, or Firm*—Jenkins, Wilson & Taylor, P.A.

(57) ABSTRACT

The development of oviparous species such as birds after hatch is enhanced by feeding a subject prior to hatch. The subject is fed with a nutrient composition and/or an enteric modulator. A preferred nutrient composition contains at least one protein, peptide, amino acid or carbohydrate; a preferred enteric modulator is hydroxymethylbutyrate. Feeding may be accomplished by administering the nutrient composition and/or enteric modulator into the amnion where it is then orally ingested by the subject.

35 Claims, 2 Drawing Sheets

ENHANCEMENT OF DEVELOPMENT OF OVIPAROUS SPECIES BY IN OVO FEEDING

This application claims the benefit of provisional application Ser. No. 60/222,744, filed Aug. 3, 2000, the disclosure of which is incorporated by reference herein in its entirety.

FIELD OF THE INVENTION

The present invention concerns methods for enhancing the development of oviparous species such as birds, reptiles and fish by the in ovo administration of nutrients, enteric modulators, or both.

BACKGROUND OF THE INVENTION

A major change occurs in the source of nutrients in the post-hatch bird as the yolk is replaced with an exogenous diet. The hatchling must switch from a yolk nutrient-based diet (mainly fats) to a solid feed diet (mainly carbohydrates and proteins). Birds hatch with an immature gastrointestinal tract-indeed, with the yolk sac still attached. After hatch the gastrointestinal tract undergoes rapid morphological, biochemical and cellular development in order to assimilate ingested nutrients. Since the intestine is instrumental in supplying the precursors for growth, its development plays an important role in the animal's ultimate ability to grow, gain weight, utilize dietary nutrients, and resist enteric disease pathogens.

All oviparous species hatch with an underdeveloped capacity to digest dietary constituents, thus hatchling growth and enteric disease resistance is greatly suppressed. Post-hatch development of this digestive capacity is facilitated by exposure of enteric tissue to dietary constituents, but this is often compromised by various environmental factors that act upon the hatchling. There is a need to facilitate the digestive capacity before hatch because there are little environmental factors that can compromise enteric development during incubation. Moreover, because shorter incubation time and weak hatchlings are observed in a number of situations, such as when eggs are produced by young hens, there is a need for new ways to stimulate the enteric development and growth of birds after hatch.

Accordingly, an object of the present invention is to provide a method of facilitating the enteric development and/or growth of birds, including both food and non-food animals such as endangered species, after hatch.

SUMMARY OF THE INVENTION

In view of the foregoing, a first aspect of the present invention is a method of facilitating the growth of an animal such as a bird after hatch, comprising feeding to an animal in ovo (preferably by administration into the amnioic fluid), a nutrient composition in an amount effective to facilitate the growth of said bird after hatch. The nutrient composition preferably comprises at least one nutrient selected from the group consisting of carbohydrates, proteins, peptides, and amino acids, and may also include minerals, vitamins, and other nutriceuticals.

A second aspect of the present invention is a method of facilitating the growth of an animal such as a bird after hatch, comprising administering to the animal in ovo an enteric modulator in an amount effective to facilitate the enteric development before hatch and/or growth of the animal after hatch.

A third aspect of the present invention is a method of facilitating the growth of a bird after hatch, comprising concurrently administering to a bird in ovo (i) a nutrient composition and (ii) an enteric modulator. The nutrient composition and the enteric modulator are together administered in an amount effective to facilitate the enteric development before hatch and/or growth of the bird after hatch, and preferably to synergistically facilitate the growth of the bird after hatch. The nutrient composition is preferably administered by feeding, and the nutrient composition preferably comprises at least one nutrient selected from the group consisting of carbohydrates, proteins, peptides, and amino acids, and may also include minerals, vitamins, and nutriceuticals.

Examples of substances which have been introduced into embryonated poultry eggs via in ovo injection include live culture vaccines, antibiotics, vitamins, and competitive exclusion media (e.g., a live replicating organism) (see generally U.S. Pat. No. 6,244,214 to Hebrank). Specific examples of treatment substances are described in U.S. Pat. No. 4,458,630 to Sharma et al, and U.S. Pat. No. 5,028,421 to Fredericksen et al. See also U.S. Pat. No. 4,458,630 to Sharma et al., U.S. Pat. No. 4,681,063 to Hebrank, and U.S. Pat. No. 5,158,038 to Sheeks et al. Insofar as the applicants are aware, the administration of nutrients or enteric modulators to birds in ovo into the amnionic fluid has neither been suggested nor disclosed. Because the hatchling orally consumes the amnionic fluid prior to hatching, administration of nutrients or enteric modulators into the embryonic amnion is fundamentally feeding the embryo an external diet prior to hatching; thus the term "in ovo feeding" is the preferred descriptor of this technology.

In ovo feeding, therefore, involves the administration into the embryonic amnion a solution or suspension of nutrients together with other natural compounds that modulate enteric development to improve the hatchling's nutritional status during the transition from embryonic nutrition to diet digestive competence. Optimal nutritional status during this critical period is crucial for the development of the digestive, skeletal, muscular, and immune systems, and it helps normalize homeostatic hormone status so important to sustain balanced metabolism. The novel aspect of this technology is the in ovo delivery of nutrients and enteric modulators into the amnion of the embryo during the last quarter of embryonic development. This methodology is necessary because the amnion is orally swallowed by the embryo, and consequently the in ovo administered feeding solution/suspension is ingested by the embryo and is presented to enteric tissues, such as enterocytes and other cells of the gut mucosal membrane.

Preferably the in ovo feeding techniques of the present invention serve to enhance the enteric development of late term embryos and hatchlings, and improves the body weights (and preferably the survival rates and disease resistance) of hatchlings, both at the time of hatch and after a period of time after hatch (e.g., two or three weeks).

A further aspect of the present invention is the use of a nutrient and the use of an enteric modulator (either separately or in combination) for the preparation of a composition for the in ovo feeding of an animal subject as described herein.

The present invention is explained in greater detail in the specification set forth below and the drawings herein.

DETAILED DESCRIPTION OF PREFERRED EMBODIMENTS

Figure 1:
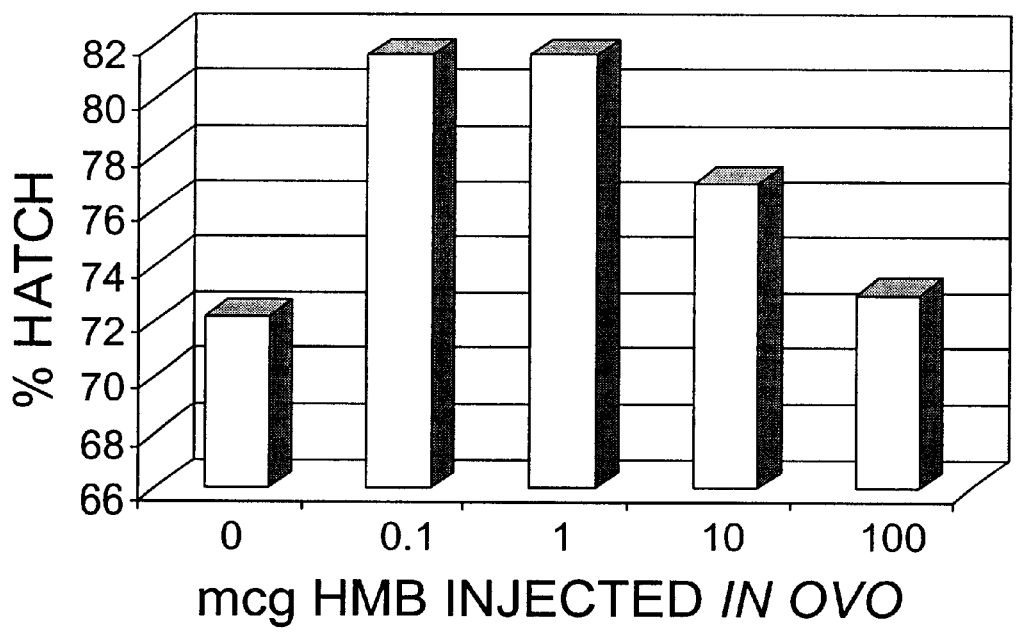
FIG. 1 shows the effect of the amount of beta-hydroxy-beta-methylbutyrate (HMB) in ovo injection (micrograms HMB in 0.1 ml saline solution) at 24 days of incubation on the hatchability rate (percent hatch) of commercial turkey poults.

Animals which may be treated by the methods of the present invention are, in general, (non-mammalian) oviparous species such as birds, or cold-blooded animals such as reptiles, amphibians, and fish. The treatment of birds is currently preferred. Any species of bird may be treated by the methods of the present invention, including but not limited to chickens, turkeys, ducks, geese, quail, pheasant, and ostrich. In addition to the production of food animals, the invention may also be used in conjunction with the raising of endangered species such as the whooping crane to assist in efforts to preserve those species.

"In ovo feeding" as used herein refers to the administration of compounds into the embryonic amnion, which is subsequently consumed by the embryo by oral means and thus comes in contact with tissues of the digestive tract.

"Concurrently administering" as used herein refers to the administration of two separate compounds or compositions in close temporal proximity to one another (for example, simultaneously or sequentially). Concurrent administration may optionally be carried out by administering the two compounds or compositions together in a common carrier (e.g., by adding an enteric modulator to a food composition).

"Synergistically" as used herein means that the combined effect of two separate active agents (e.g., a nutrient composition and an enteric modulator) is greater than that which would be expected from the sum of the two agents when administered separately.

"Growth" as used herein refers to at least one of enhanced or increased weight gain after hatch, larger hatchlings at time of hatch, improved efficiency of feed (food) utilization after hatch, reduced days to market (consumption) size (i.e., a predetermined size), etc., all as compared to animals that have not received in ovo administration of the nutrient composition and/or enteric modulator.

An "enteric modulator" as used herein refers to a compound that stimulates the development and/or metabolism of a cell of the digestive system, such cells including but not limited to enterocytes, goblet cells, intestinal lymphocytes, etc. Examples of suitable enteric modulators include, but are not limited to, β-hydroxy-β-methylbutyrate (HMB), organic zinc complexes (Zn-amino acid complex, Zn-proteinate, Zn-chelates with a carbohydrate or protein or organic acid), lectins (Concanavolin A, Poke Weed Mitogen, Wheat Gluten Antigen, bean lectins, or lectins from microbial sources), glutamine or glutamate, arginine, carnitine, creatine, vitamins A, D, or E, betaine, choline, lethithin, S-adenosylmethionine, tyrosine and its metabolic derivatives (e.g. doppamine, norepinepherine, epinephrine), Tryptophan and its metabolic derivatives (e.g. seritonin, melatonin), glucosamine, fatty acid derivatives (omega-3 fatty acids, conjugated Linoleic acid, prostoglandins), and antioxidants (bioflavoids, ascorbic acid, rutin, BHT, ethoxyquin, vitamin, pyrroloquinoline quinone and its derivatives, carotenoids). Beta-hydroxy-beta-methylbutyrate (HMB) (including the edible salts thereof) is known and disclosed in, among other references, U.S. Pat. No. 5,028,440 to Nissen. HMB may be administered to the eggs in any suitable amount, such as (for chicken and turkey eggs) 0.01, 0.05 or 0.1 to 1, 2, 3 or 5 micrograms per egg.

"Nutrient" as used herein refers to essential nutrients that are necessary for the growth of an animal to which they are fed. Nutrients include (a) proteins and protein fragments (e.g., peptides and amino acids such as lysine), (b) carbohydrates (sugars including monosaccharides, starches, dextrin, dextrose, oligosaccharides and polysaccharides), (c) lipids, etc.

"Nutrient composition" refers to a food composition comprising at least one nutrient, and preferably containing at least one, or both, of (a) at least one protein or protein fragment and (b) at least one carbohydrate. The total caloric composition of the nutrient composition will depend upon the particular species being treated, but will typically be at least about one-tenth, one, five, or ten calories up to twenty, forty, 100 or 200 calories, or more. For chickens and turkeys, the total caloric composition of the nutrient composition will be from about one-half or one to twenty or forty calories. Since the average caloric content of a chicken egg is about 70 calories, the in ovo feeding solution may supplement an additional one-half percent or 1% to 10% calories to the total egg. The composition may be in any form including liquids, solids, and combinations thereof, examples including but not limited to solutions, emulsions, suspensions, etc. The nutrient composition preferably includes at least one protein, peptide or amino acid, and/or preferably includes at least one monosaccharide or polysaccharide (i.e., a carbohydrate). In general, in one embodiment of the invention, at least about one tenth of the total calories are contributed from monosaccharides and/or polysaccharides, and/or protein, and/or amino acids in the composition. It is particularly preferred that the composition contain at least one carbohydrate. The osmotic pressure of the composition is preferably not greater than about 800 millisomoles (mOsm), and is preferably from about 50, 100, 200 or 300 to about 600 or 700 milliosmoles.

Applicants specifically intend that the disclosures of all United States patent references cited herein be incorporated herein by reference in their entirety.

As noted above, the present invention may be practiced with any type of egg, including chicken, turkey, duck, goose, quail, pheasant, and ostrich eggs. Chicken and turkey eggs (including meat-type chicken eggs) are most preferred. Eggs treated by the methods of the invention are fertile eggs, which are preferably in the fourth quarter of incubation. Chicken eggs may be treated on about the fifteenth to nineteenth day of incubation, and are most preferably treated on about the seventeenth or eighteenth day of incubation. Turkey eggs are preferably treated on about the twentieth to twenty sixth day of incubation, and are more preferably treated on about the twenty-second, twenty-third, or twenty-fourth day of incubation.

The site of injection or administration of the nutrient composition and/or enteric modulator may be in the air cell or in the region defined by the amnion, including the amniotic fluid, the embryo itself and the yolk sac. For feeding of the nutrient composition and/or enteric modulator to the subject in ovo, the nutrient composition is preferably administered into the amniotic fluid which can then be orally ingested by the bird, into the air cell where the composition can be orally ingested upon internal piping (or by diffusion across the air cell membrane), by direct injection into the yolk sac, etc. Thus in one embodiment the nutrient composition is preferably deposited in the amniotic fluid; in another embodiment the enteric modulator is preferably deposited in the air cell. The location of administration of the nutrient composition and/or enteric modulator may be the same or different.

The mechanism of administration is not critical, but it is preferred that the method not unduly damage the tissues and organs of the embryo so that the treatment will not significantly decrease hatchability and hatch rate. A syringe fitted with a needle of about no. 22 gauge is suitable for the purpose. To inject into the amnion fluid the needle must be inserted into the egg. A pilot hole may optionally be punched or drilled through the shell prior to insertion of the needle to prevent damaging or dulling of the needle. If desired the egg can be sealed with a sealing material such as wax or the like to prevent subsequent entry of undesirable bacteria.

It is envisioned that high speed automated injection systems for avian embryos will be particularly suitable for practicing the present invention. Numerous such devices are available, exemplary being those disclosed in U.S. Pat. Nos. 4,040,388, 4,469,047 and 4,593,646. One preferred apparatus for practicing the present invention is disclosed in European Patent Application No. 87305746 to Embrex. Other apparatus is commercially available from Embrex Inc., Research Triangle Park, N.C. USA.

After injection or administration of the nutrient composition and/or enteric modulator, eggs are incubated to hatch. The live animals are then fed a suitable feed composition and grown as desired, typically for at least a period of one to two weeks, depending upon the particular species and the end use of the species. Enhanced growth after hatch resulting from the administration of the nutrient composition and/or enteric modulator is observed in the overall population of animals produced.

As noted above, a further aspect of the invention involves compositions and the use of such compositions for the in ovo feeding of an animal subject as described herein. Such compositions may be prepared by combining one or more nutrients as described above, in the amounts described above, and/or by combining an enteric modulator as described herein, in a suitable carrier such as water for injection. The compositions preferably have the osmotic pressures described above. In one embodiment of the invention, the compositions are sterile. The compositions may be prepared in unit dosage form or in batch form for injection with a suitable injection apparatus as described herein.

The present invention is explained in greater detail in the following non-limiting Examples.

EXAMPLE 1

Administration of Nutrients and Enteric Modulator to Turkeys in ovo

Three hundred commercial turkey eggs were stored for three weeks in a cooler at 55° F. and then placed in an egg incubator and incubated. After 24 days of incubation, eggs identified as fertile by candling the eggs were randomly assigned to 5 groups of 50 eggs. Each group of 50 eggs was then injected into the air cell at a depth of 0.25 inches with a 0.10 ml saline (0.89% NaCl) solution containing 0, 0.1, 1.0, 10.0, and 100.0 micrograms of Calcium beta-hydroxy-beta-methylbutyrate (HMB) (obtained from Metabolic Technologies, Inc., Ames, Iowa, USA).

After all of the eggs were injected they were then placed in hatching baskets such that each treatment was equally represented in each location of the incubator. Hatched poults were recovered from the incubator at 28 days of incubation and the number of hatched poults per treatment group recorded. The hatched poults were then sacrificed and blood glucose was determined in accordance with known techniques (Donaldson and Christensen, *Comp. Biochem. Physiol.* 98A, 347–350 (1991)). Livers were removed and glycogen content of each liver was determined by known techniques (Dreiling et al., *Meat Sci.* 20, 167–177 (1987)).

FIG. 1 illustrates the effect of the amount of HMB injected into the eggs of 24 day old turkey embryos. Hatch rate of the control treatment (0 micrograms HMB) was characteristically low for late season layed turkey eggs subjected to 3 weeks storage prior to setting in the incubator. However, when 0.1 and 1.0 micrograms of HMB was injected into the eggs at 24 days of incubation, hatchability rate increased from 72.3% to 81.6%. As the level of HMB injected increased above 1.0 micrograms, hatchability rate decreased. There was a significant quadratic dose response ($P<0.05$) as the level of HMB injected in ovo icnreased.

Figure 2:
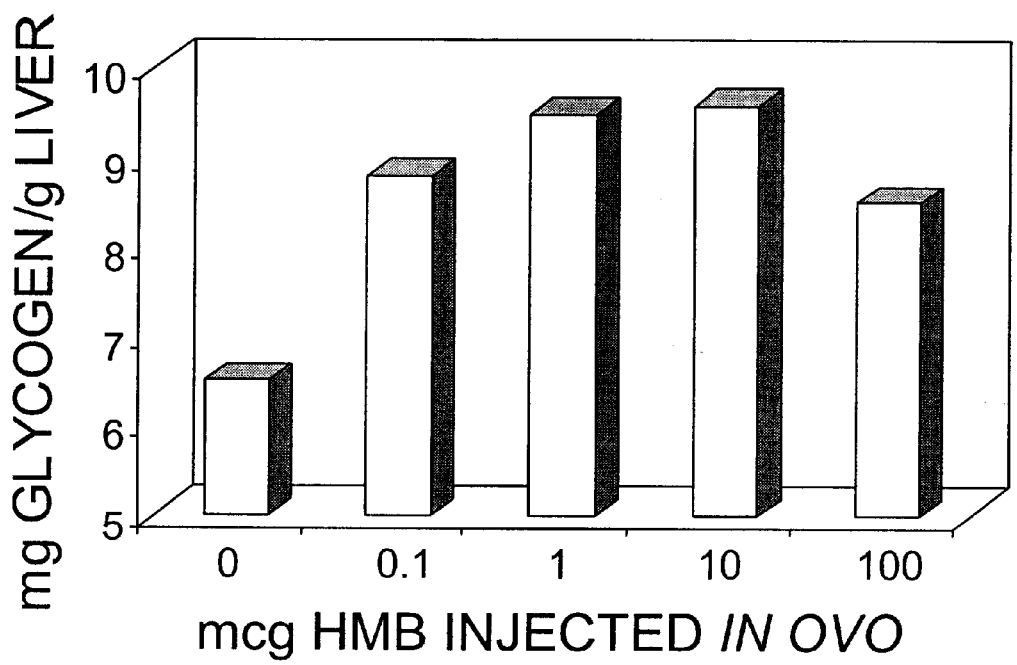
FIG. 2 shows the effect of the amount of beta-hydroxy-beta-methylbutyrate (HMB) in ovo injection (micrograms HMB in 0.1 ml saline solution) at 24 days of incubation on the liver glycogen concentration of commercial turkey poults.

The effect of HMB dosage injected in ovo on liver glycogen content in turkey poults is illustrated by FIG. 2. Liver glycogen content was increased by about 40% in all HMB dosage levels as compared with the control treatment. There was a significant quadratic dose response ($P<0.5$) as the level of HMB injected in ovo increased. hatchability rate has been positively correlated with liver glycogen content of turkey and chick embryos before hatch.

Figure 3:
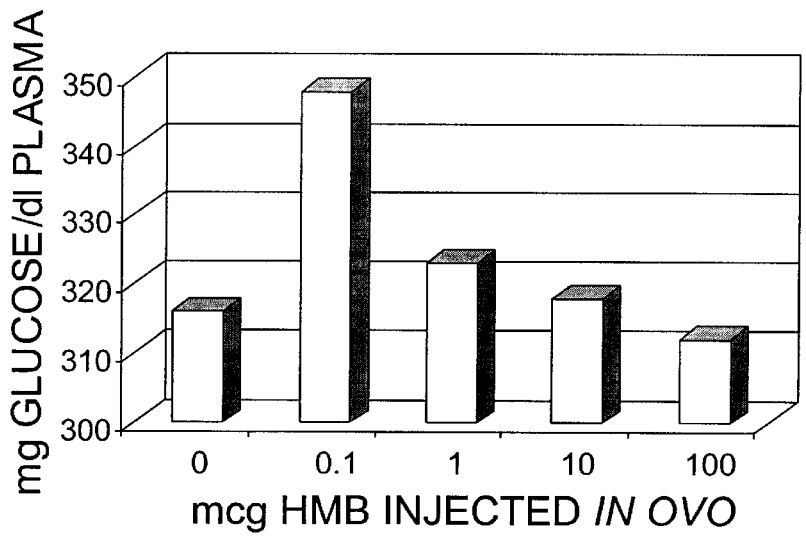
FIG. 3 shows the effect of the amount of beta-hydroxy-beta-methylbutyrate (HMB) in ovo injection (micrograms HMB in 0.1 ml saline solution) at 24 days of incubation on the plasma glucose concentration of commercial turkey poults.

FIG. 3 illustrates that plasma glucose concentration was significantly increased only by the 0.1 microgram HMB dosage. All the other HMB dosage levels had no significant effect on plasma glucose as compared with the control treatment. These results indicate that the 0.1 microgram dosage level of HMB may not be the lowest functional dose to affect plasma glucose levels of poults.

In summary, in ovo injection of 0.1 to 1.0 micrograms of HMB into 24 day old turkey embryos significantly increases hatching rate, apparently due to an improvement in liver glycogen reserves.

EXAMPLE 2

Preparation and Administration of Feeding Solution Primarily Containing Sugars to Chickens An injection solution including sugars and containing (by weight) 10% sucrose, 10% maltose, 5% dextran, all dissolved in 0.9% NaCl solution, was prepared (Other minerals, vitamins and short peptides could optionally be included. In addition, small organic particles from the in ovo feed constituents are included in order to perform physical stimulation of the intestine. The total injected volume was about 1 ml per egg. (note, in the case of injection into the yolk the feeding solution should be prepared as an emulsion. Results are given in Table 2, Table 3, Table 4 and Table 5 below.

TABLE 2

Effect of in ovo feeding of sugars on hatchability

| Eggs in the incubator | % hatchability of Total Eggs Set |
| --- | --- |
| Control eggs[1] | 87 |
| In ovo fed eggs[1] | 86 |

TABLE 3

Effect of in ovo feeding of sugars on embryo's and hatchling's weight.

| Average weights (gr.)[1] | Days of Incubation | | | |
| --- | --- | --- | --- | --- |
| | 18 d | 19 d | 20 d | 21 d(Hatch) |
| (Weight of Eggs, grams) | | | | |
| Control | 59.8 ± 1.4 a | 59.4 ± 1.4 a | 59.0 ± 1.3 a | |
| In ovo fed | 61.1 ± 1.3 a | 60.9 ± 1.2 a | 60.3 ± 1.1 a | |
| (Weight of Embryo, grams) | | | | |
| Control | 49.02 ± 0.9 a | 49.3 ± 0.7 a | 49.9 ± 0.6 b | 48.92 ± 0.6 b |
| In ovo fed | 48.58 ± 0.7 a | 50.6 ± 0.8 a | 51.8 ± 0.7 a (+3.8%) | 52.62 ± 0.6 a (+5.8%) |

[1]n = 100;
a, b = mean values within a column bearing different letters were significantly different, P < 0.05.

TABLE 4

Effect of in ovo feeding of sugars on the morphological development of the small intestine of chick embryos.

| Days of Incubation | Small Intestine Diameter (mm) | | Intestinal Villi Height (microns) | |
| --- | --- | --- | --- | --- |
| | Control | In ovo fed | Control | In ovo fed |
| 18 | 1.18 ± 0.06 a | 1.18 ± 0.06 a | 157 ± 4 a | 157 ± 4 a |
| 19 | 1.22 ± 0.07 a | 1.35 ± 0.09 a (+10.6%) | 207 ± 3 b | 238 ± 6 a (+15.0%) |
| 20 | 1.24 ± 0.02 b | 1.46 ± 0.08 a (+17.7%) | 208 ± 3 b | 306 ± 3 a (+47.1%) |
| 21 (Hatch) | 1.46 ± 0.08 b | 1.67 ± 0.06 a (+14.4%) | 332 ± 7 b | 426 ± 10 a (+28.3%) | n = 6 birds at each age;
a, b = Mean values within a row bearing different letters were significantly different, P < 0.05.

TABLE 5

Effect of in ovo feeding of sugars on chicken weight.

| Age[1] | Control chickens[2] | In ovo fed chickens[2] |
| --- | --- | --- |
| | (Body Weight, grams) | |
| Day of hatch | 48.92 ± 0.68 b | 52.62 ± 0.66 a (+7.6%) |
| 3 days | 69.31 ± 0.93 b | 74.8 ± 0.74 a (+7.9%) |
| 7 days | 129 ± 2.13 b | 134.6 ± 1.84 a (+4.3%) |
| 10 days | 156.3 ± 2.9 b | 161.7 ± 2.7 a (+3.5%) |
| 35 days | 1523 ± 21.56 b | 1591 ± 24.7 a (+4.5%) |

[1]n = 100;
[2]equal number of males and females;
a, b = mean values within a row bearing different letters were significantly different, P < 0.05.

Table 2 shows that the effect of the in ovo feeding treatment on egg hatchability was negligible. Table 3 shows that in ovo feeding had no effect on total egg weight, but it resulted in a significant increase in embryo weight at days 20 and 21 of embryonic development by 3.8% and 5.8%, respectively. Table 4 illustrates the positive effect of in ovo feeding at 18 days of incubation on embryonic enteric development. Two days following in ovo feeding, small intestine diameter was increased by 17.7% and enteric villi height increased by 47.1%. Table 5 shows a significant difference in weight between control chicks and in ovo fed chicks at day of hatch and at days 3, 7 10 and 35 after hatch. In ovo-fed birds sustained 3% to 8% higher body weights after hatch that controls.

EXAMPLE 3

Preparation and Administration of a Feeding Solution Primarily Containing Complex Carbohydrate to Chickens An injection solution including sugars and containing (by weight) 5% sucrose, 5% maltose, 15% dextrin, all dissolved in 0.9% NaCl solution, was prepared (Other minerals, vitamins and short peptides could optionally be included. The total injected volume was about 1 ml per egg. Results are given in Table 6 below.

TABLE 6

Effect of in ovo feeding of complex carbohydrate and sugars on chicken weights.

| Age[1] | Control chickens[2] | In ovo fed chickens[2] |
| --- | --- | --- |
| | (Body Weight, grams) | |
| Day of hatch | 48.9 ± 0.5 b | 50.8 ± 0.4 a (+3.9%) |
| 4 days | 79.9 ± 1.4 b | 83.7 ± 1.2 a (+4.7%) |
| 25 days | 888.3 ± 7 b | 913.4 ± 11 a (+3.1%) |

[1]n = 100;
[2]equal number of males and females;
a, b = mean values within a row bearing different letters were significantly different, P < 0.05.

Table 6 illustrates that in ovo feeding a solution containing primarily a complex carbohydtate in the form of dextrin significantly increased body weights of birds by 3% to 5% through to 25 days of age in comparison to controls.

EXAMPLE 4

Preparation and Administration of a Feeding Solution Containing Carbohydrate and Protein to Chickens An injection solution including containing 2.5% sucrose, 2.5% maltose, 12% dextrin, and 8.25% egg white protein (by weight), all dissolved in 0.9% NaCl solution, was prepared (Other minerals, vitamins and short peptides could optionally be included. The total injected volume was about 1 ml per egg. Results are given in Table 7 below.

TABLE 7

Effect of in ovo feeding of carbohydrate and protein on chicken weights.

| Age[1] | Control chickens[2] | In ovo fed chickens[2] |
|---|---|---|
| | (Body Weight, grams) | |
| Day of hatch | 47.4 ± 0.6 b | 49.0 ± 0.5 a (+3.3%) |
| 7 days | 133.4 ± 3.1 b | 140.2 ± 3.3 a (+5.1%) |
| 14 days | 311.8 ± 5.8 b | 327.7 ± 5.8 a (+5.1%) |

[1] n = 100;
[2] equal number of males and females;
a, b = mean values within a row bearing different letters were significantly different, $P < 0.05$.

Table 7 illustrates that in ovo feeding a solution containing carbohydrates and protein in a proportion similar to a typical chick diet significantly increased body weights of birds by 3% to 5% in comparison to controls.

EXAMPLE 5

Preparation and Administration of a Feeding Solution Containing Protein to Turkeys An injection solution including 24% egg white protein, all dissolved in 0.9% NaCl solution, was prepared (Other minerals, vitamins and short peptides could optionally be included. The total injected volume was about 2 ml per egg. Results are given in Table 8 below.

TABLE 8

Effect of in ovo feeding of protein on turkey weights.

| Age[1] | Control turkeys[2] | In ovo fed turkeys[2] |
|---|---|---|
| | (Body Weight, grams) | |
| Day of hatch | 65.8 ± 0.6 b | 68.7 ± 1.1 a (+4.4%) |
| 3 days | 84.6 ± 1.4 b | 91.1 ± 1.8 a (+7.6%) |
| 12 days | 273.5 ± 4.3 b | 286.2 ± 4.9 a (+4.7%) |

[1] n = 100;
[2] equal number of males and females;
a, b = mean values within a row bearing different letters were significantly different, $P < 0.05$.

Table 8 illustrates that in ovo feeding a solution containing protein significantly increased body weights of birds by 4% to 8% in comparison to controls. Turkeys were found to respond better to a high protein in ovo feed formulation than broilers. This indicates that optimum in ovo feed formulation may vary depending on species and other animal-specific characteristics.

EXAMPLE 6

Preparation and Administration of a Feeding Solution Containing Carbohydrate, Protein and an Enteric Modulator to Chickens An injection solution including sugars and containing (by weight) 5% maltose, 12% dextrin, 8.25% egg white protein, and 0.1% HMB, all dissolved in 0.9% NaCl solution, was prepared (Other minerals, vitamins and short peptides could optionally be included. The total injected volume is 1–3 ml per egg. Results are given in Table 9 below.

TABLE 9

Effect of in ovo feeding of carbohydrate and protein on chicken weights.

| Age[1] | Control chickens[2] | In ovo fed chickens[2] |
|---|---|---|
| | (Body Weight, grams) | |
| Day of hatch | 47.9 ± 0.6 b | 49.4 ± 0.3 a (+3.1%) |
| 4 days | 76.7 ± 1.0 b | 71.3 ± 0.7 a (+6.8%) |
| 10 days | 207.1 ± 4 b | 192.5 ± 4 a (+7.8%) |

[1] n = 100;
[2] equal number of males and females;
a, b = mean values within a row bearing different letters were significantly different, $P < 0.05$.

Table 9 illustrates that in ovo feeding a solution containing carbohydtates and protein in a proportion similar to a typical chick diet plus the enteric modulator, HMB, significantly increased body weights of birds by 3% to 8% in comparison to controls. Inclusion of HMB in the in ovo feeding solution enhances the development of enteric tissues in the presence of nutrients.

EXAMPLE 7

Preparation and Administration of a Feeding Solution Containing Protein and HBM to Turkeys An injection solution including 24% egg white protein and 0.1% HMB, all dissolved in 0.9% NaCl solution, was prepared (Other minerals, vitamins and short peptides could optionally be included. The total injected volume was about 2 ml per egg. Results are given in Table 10 below.

TABLE 10

Effect of in ovo feeding of protein on turkey weights.

| Age[1] | Control turkeys[2] | In ovo fed turkeys[2] |
|---|---|---|
| | (Body Weight, grams) | |
| Day of hatch | 68.3 ± 0.7 b | 71.2 ± 0.1 a (+4.2%) |
| 10 days | 142.8 ± 3.2 b | 150.2 ± 4.5 a (+5.0%) |
| 24 days | 531 ± 412 b | 563 ± 5.4 a (+6.0%) |

[1] n = 100;
[2] equal number of males and females;
a,b = mean values within a row bearing different letters were significantly different, $P < 0.05$.

Table 10 illustrates that in ovo feeding a solution containing protein plus the enteric modulator, HMB, significantly increased body weights of birds by 4% to 6% in comparison to controls. Inclusion of HMB improved the response of turkeys to in ovo-fed protein, possibly by enhancing enteric tissue development. Other enteric modulators are expected to have a similar response.

EXAMPLE 8

Preparation and Administration of a Feeding Solution Containing Carbohydrates, Protein, and HBM to Broilers and Turkeys An injection solution including sugars and containing (by weight) 5% maltose, 12% dextrin, 8.25% egg white protein, and 0.1% HMB was administered in ovo to hatching eggs from a young flock of chicken broiler hens. Similarly, an injection solution including 6% dextrin, 15% egg white protein and 0.1% HMB was administered in ovo to hatching eggs from an old flock of turkey hens. Feeding solutions for both chickens and turkeys included a 0.9% NaCl solution. The total injected volume for the chicken and turkey hatching eggs was about 1 and 2 ml per egg, respectively. Results are given in Table 11 below.

TABLE 11

Effect of in ovo feeding on hatchability of chicks and poults.

| Poultry Species | Control[1] | In ovo fed[1] |
|---|---|---|
| (Hatching rate, % of total fertile eggs set) | | |
| Chicken Broilers[2] | 77 b | 89 a |
| (Young hen flock) | | (+15.6%) |
| Turkeys[3] | 67 b | 78.7 a |
| (Old hen flock) | | (+17.5%) |

[1]equal number of males and females;
[2]In ovo feed contained 17% carbohydrates, 8.25% protein, and 0.1% HMB
[3]In ovo feed contained 6% carbohydrates, 15% protein, and 0.1% HMB
a,b = mean values within a row bearing different letters were significantly different, $P < 0.05$.

Table 11 shows that in ovo feed treatment significantly improved hatachability of both chickens and turkeys. The added enhanced embryonic development and nutritional status of the chicks and poults helped a greater proportion of the hatchlings in their struggle to emerge from the shell.

EXAMPLE 9

Importance of in ovo Feed Solution Osmolality on Chick Hatchability

Fertile broiler chicken hatching eggs were injected in ovo into the amnion with solutions of various degrees of osmolarity. Percent hatch of fertile eggs were recorded. The results are given in FIG. 4.

Figure 4:
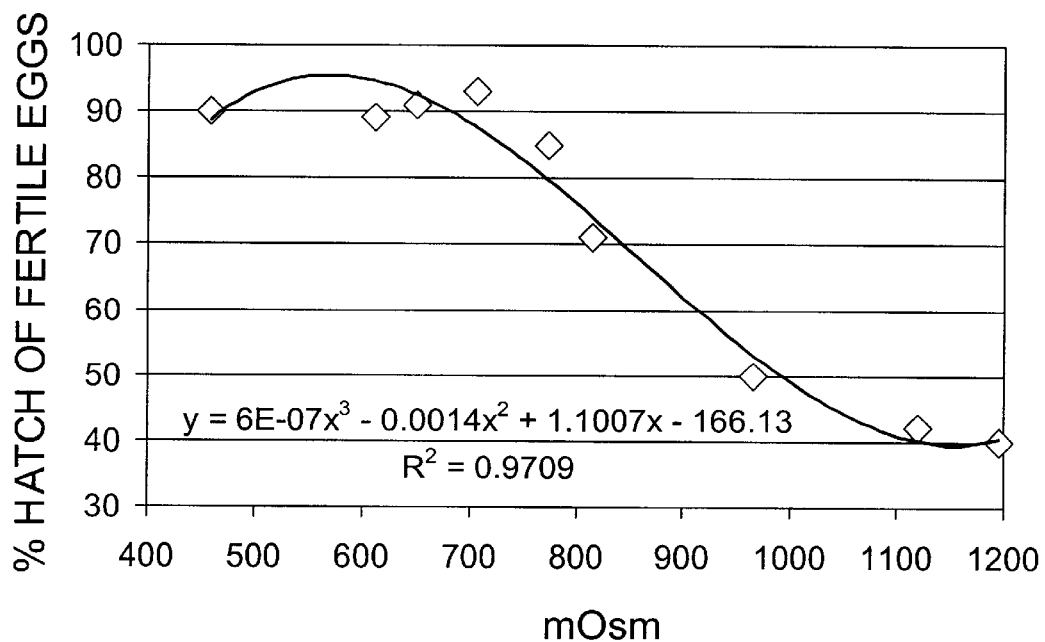
FIG. 4 shows the effect of in ovo feeding solution osmolarity (mOsm) on hatchability of chicks.

FIG. 4 illustrates the importance on the osmolarity of the in ovo feeding solution on hatchability of chicks. Acceptable hatchability of chicks was observed when eggs were injected with solutions having an osmolarity ranging below 800 mOsm with an optimum hatchability observed at about 400 to 600 mOsm. Unacceptable hatching rates were observed when the in ovo feeding solution exceeded 800 mOsm. The effect of in ovo feed solution osmolarity on hatchability is highly predictable by a mathematical model ($R^2=0.97$).

The foregoing is illustrative of the present invention, and is not to be construed as limiting thereof. The invention is defined by the following claims, with equivalents of the claims to be included therein.

That which is claimed is:

1. A method of facilitating the growth of a bird before hatch and after hatch, comprising administering to the bird in ovo a nutrient composition which comprises at least one nutrient selected from the group consisting of carbohydrates, proteins, peptides and amino acids in a supplement amount of at least 0.5% of a total caloric content of said ovo prior to said administering, to thereby facilitate enteric development of said bird before hatch and growth of said bird after hatch.

2. The method according to claim 1, wherein said bird is selected from the group consisting of chickens, turkeys, ducks, geese, quail, pheasant, and ostrich.

3. The method according to claim 1, wherein said feeding step is carried out during the last quarter of in ovo incubation.

4. The method according to claim 1, further comprising the step of incubating said bird to hatch.

5. The method according to claim 1, wherein said nutrient composition comprises at least one nutrient selected from the group consisting of proteins, peptides and amino acids.

6. The method according to claim 1, wherein said nutrient composition comprises lysine.

7. The method according to claim 1, wherein said nutrient composition comprises at least one carbohydrate.

8. The method according to claim 1, wherein said nutrient composition comprises at least one sugar or carbohydrate selected from the group consisting of sucrose, maltose, dextran, and dextrin.

9. The method according to claim 1, wherein said nutrient composition contains from one-half to one hundred calories.

10. The method according to claim 1, wherein said nutrient composition has an osmotic pressure not greater than 800 milliosmoles.

11. The method according to claim 1, wherein said nutrient composition contains at least one carbohydrate, wherein the total caloric content of said nutrient composition consists of from one-half to ten percent of the total caloric content of the total contents of the egg containing said bird, and wherein said nutrient composition has an osmotic pressure of from about 100 to 600 milliosmoles.

12. A method of facilitating the growth of a bird before hatch and after hatch, comprising concurrently administering to a bird in ova (i) a nutrient composition which comprises at least one nutrient selected from the group consisting of carbohydrates, proteins, peptides and amino acids in a supplement amount of at least 05% of a total caloric content of said ova prior to said administering; and (ii) an enteric modulator, to thereby facilitate enteric development of said bird before hatch and growth of said bird after hatch.

13. A method according to claim 12, wherein said nutrient composition and said enteric modulator are administered simultaneously.

14. A method according to claim 12, wherein said nutrient composition and said enteric modulator are administered sequentially.

15. The method according to claim 12, wherein said nutrient composition and said enteric modulator are administered in a synergistically effective amount.

16. The method according to claim 12, wherein said bird is selected from the group consisting of chickens, turkeys, ducks, geese, quail, pheasant, and ostrich.

17. The method according to claim 12, wherein said administering step is carried out during the last quarter of in ovo incubation.

18. The method according to claim 12, further comprising the step of incubating said bird to hatch.

19. The method according to claim 12, wherein said nutrient composition comprises at least one nutrient selected from the group consisting of proteins, peptides and amino acids.

20. The method according to claim 12, wherein said nutrient composition comprises lysine.

21. The method according to claim 12, wherein said nutrient composition comprises at least one carbohydrate.

22. The method according to claim 12, wherein said nutrient composition comprises at least one carbohydrate selected from the group consisting of sucrose, maltose, and dextran.

23. The method according to claim 12, wherein said nutrient composition comprises from one to one hundred calories.

24. The method according to claim 12, wherein said nutrient composition has an osmotic pressure not greater than 800 milliosmoles.

25. The method according to claim 12, wherein said nutrient composition contains at least one carbohydrate, wherein the total caloric content of said nutrient composition consists of from one-half to ten percent of the total caloric content of the total contents of the egg containing said bird, and wherein said nutrient composition has an osmotic pressure of from about 100 to 600 milliosmoles.

26. The method according to claim 12, wherein said enteric modulator is beta-hydroxy-beta-methylbutyrate.

27. The method according to claim 12, wherein said enteric modulator is an organic zinc complex or lectin.

28. The method according to claim 2, wherein the bird is a chicken and the in ovo feeding occurs at fifteen to nineteen days of incubation.

29. The method according to claim 16, wherein the bird is a chicken and the in ovo feeding occurs at fifteen and nineteen days of incubation.

30. The method according to claim 2, wherein the bird is a turkey and the in ovo feeding occurs at twenty to twenty-six days of incubation.

31. The method according to claim 16, wherein the bird is a turkey and the in ovo feeding occurs at twenty to twenty-six days of incubation.

32. The method according to claim 1, wherein the nutrient composition comprises a nutriceutical.

33. The method according to claim 32, wherein the nutriceutical is a vitamin or a mineral.

34. The method according to claim 12, wherein the nutrient composition comprises a nutriceutical.

35. The method according to claim 34, wherein the nutriceutical is a vitamin or a mineral.

* * * * *